(12) United States Patent
Brunschwiler

(10) Patent No.: US 9,624,037 B2
(45) Date of Patent: Apr. 18, 2017

(54) DEVICE AND A METHOD FOR BRAKING CONVEYING VEHICLES OF A CONVEYING DEVICE

(71) Applicant: Ferag AG, Hinwil (CH)

(72) Inventor: Othmar Brunschwiler, Bettwiesen (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 14/657,543

(22) Filed: Mar. 13, 2015

(65) Prior Publication Data

US 2015/0266673 A1    Sep. 24, 2015

(30) Foreign Application Priority Data

Mar. 18, 2014 (CH) .......................................... 413/14

(51) Int. Cl.
*B65G 47/26* (2006.01)
*B65G 9/00* (2006.01)

(52) U.S. Cl.
CPC .................................. *B65G 9/006* (2013.01)

(58) Field of Classification Search
CPC ....... B65G 9/006; B65G 37/005; B65G 47/26
USPC ........ 198/343.1, 419.1, 440, 457.03, 457.06, 198/459.8; 242/147 R, 156.1, 410, 420.2; 188/271; 104/104, 226
See application file for complete search history.

(56) References Cited

U.S. PATENT DOCUMENTS

| | | | | |
|---|---|---|---|---|
| 4,452,407 A * | 6/1984 | Ogata | ................... | G11B 25/066 242/336 |
| 4,605,121 A * | 8/1986 | Wahren | ................ | B23Q 7/1426 198/465.1 |
| 4,942,956 A * | 7/1990 | Acker | ................... | B65G 49/025 104/162 |
| 4,946,023 A * | 8/1990 | Heinold | ................. | B65G 47/61 198/419.1 |
| 5,042,644 A * | 8/1991 | Davis | .................... | B65G 47/263 198/781.06 |
| 5,439,094 A * | 8/1995 | Hakansson | ............ | B65G 47/82 198/419.1 |
| 5,579,695 A * | 12/1996 | Cockayne | ................ | B23Q 1/28 104/106 |
| 7,219,793 B2 * | 5/2007 | Robertsson | .......... | B65G 17/002 104/26.2 |
| 7,344,017 B1 * | 3/2008 | Taguchi | ................. | B23Q 1/626 198/468.01 |
| 7,365,463 B2 * | 4/2008 | Horst | ................... | H02K 57/006 242/410 |
| 7,497,167 B2 * | 3/2009 | Bellezza | ................ | B62D 65/18 104/88.01 |
| 7,637,213 B2 * | 12/2009 | Cylvick | .................... | B61B 7/02 104/112 |

(Continued)

FOREIGN PATENT DOCUMENTS

FR    607415    3/1926

*Primary Examiner* — Douglas Hess
(74) *Attorney, Agent, or Firm* — Rankin, Hill & Clark LLP

(57) ABSTRACT

A brake device for a conveying device for braking a conveying vehicle moving along a movement path, including at least one brake member for creating a braking contact with the conveying vehicle. The brake member includes at least one deflection member and at least one flexible brake body with a braking-active body section, the brake body being led in a revolving manner around the at least one deflection member.

19 Claims, 5 Drawing Sheets

(56) References Cited

U.S. PATENT DOCUMENTS 7,694,803 B1 * 4/2010 Call .................. B65G 39/20
104/172.5
8,871,045 B2 * 10/2014 Conti ................ B65H 19/2207
156/110.1
9,213,006 B2 * 12/2015 Wood ................ G01N 23/203

* cited by examiner

DEVICE AND A METHOD FOR BRAKING CONVEYING VEHICLES OF A CONVEYING DEVICE

BACKGROUND OF THE INVENTION

Field of the Invention

The present invention relates to the field of conveying technology and relates to a braking device for braking a conveying vehicle which is moved along a movement path. The present invention moreover relates to a conveying device with a braking device as well as to a method for braking a conveying vehicle. The braking device includes a brake element for creating a braking contact with the conveying vehicle.

Description of Related Art

Conveying devices with conveying vehicles which are led by rail and which are led independently of one another along guide rails via runner rollers or sliding elements are known in the art. Such conveying devices are designed, for example, as gravity conveyors. With such devices, the conveying vehicles are moved via drivers to a higher potential level, from where these are moved along a guide rail in the direction of a lower potential level by way of gravity. The term "potential level" relates to the potential energy of the conveying vehicles in the gravitational field.

The conveying path or the guide rail accordingly has an ascent on conveying from a lower to a higher potential level. The conveying path or the guide rail accordingly has a drop or descent, on conveying from a higher to a lower potential level.

Holding elements are coupled to the conveying vehicles in each case and these receive and hold the piece goods to be conveyed. The piece goods are thus conveyed along a conveying stretch defined by the guide rail, by way of the conveying vehicles.

The mentioned conveying devices have the advantage that the conveying vehicles can be moved individually, i.e. independently of one another, along a conveying stretch. This, for example, permits the conveying of piece goods along different conveying paths or a buffering of conveying vehicles occupied with piece goods, along a conveying stretch.

The patent application EP-B-0 856 480 describes a conveying device with a plurality of rail-led conveying vehicles. The conveying vehicles include runner rollers, with which the conveying vehicles roll along the guide rail.

The patent publication EP-B-1 169 249 describes a method and a device for the conveying of piece gods. The piece goods are loaded onto holding means, are conveyed in a manner held by the holding means and are unloaded again from the holding means.

Working steps are often carried out along the conveying stretch of a conveying device, and these steps demand a controlled movement of the conveying vehicles, in particular also with respect to the speed.

Means are required, in order to adapt the speed of the conveying vehicles in front of a processing device or pacing device, since the conveying vehicles however are moved in an uncontrolled manner and with an individual speed along a descent, and moreover since the speed for a subsequent processing device or pacing device is often too large.

Thus, for example, a controlled speed of the conveying vehicles is necessary for the pacing of the conveying vehicles by way of a pacing device. The pacing device is to move the conveying vehicles at uniform distances to one another and with a uniform speed, along a conveying stretch. This permits the execution of pace-controlled processing steps on the piece goods conveyed by the conveying vehicles.

SUMMARY OF THE INVENTION

It is therefore an object of the present invention, to provide a braking device for braking a conveying vehicle which is moved along a movement path. The braking device preferably slows the conveying vehicle in an as gentle and soft as possible manner.

According to a further object, the braking device will brake the conveying vehicle along a movement direction in a braking section and move the conveying vehicle out of the braking section again at a defined speed. The speed of the conveying vehicle on leaving the braking section should moreover be changeable by way of a drive, with as little as possible effort with regard to control technology.

Moreover, a further object of the present invention is to provide a braking device with an as simple as possible construction.

According to a further object, the braking effect should also be able to be set by way of simple means and be adaptable to the running behaviour of the conveying vehicles.

At least one of the objects is achieved by way of the brake member including at least one deflection member and at least one flexible brake body that is led in a revolving manner about the at least one deflection member.

"Led in a revolving manner" in particular means that the brake body is moved along a closed movement path and is deflected by the at least one deflection member, without the brake body however being fixedly connected to the deflection member.

The deflection member or members are preferably rotatably mounted.

The brake body may be designed in an endless manner. The brake body may be a longitudinal body. The brake body is preferably limp.

The brake body may, in particular, be a chain. The chain consists of a plurality of chain links that are articulately connected to one another. The chain is formed from metal, such as steel, for example.

The brake body can moreover also be a flat-belt, a cable, a strap or a belt, in particular a toothed belt.

The deflection member or members can be cogs (toothed wheels) if the brake body is designed as a chain or toothed belt.

The deflection member or members can also be designed as deflection rollers.

Brake elements can be provided on the brake body and the braking contact to the conveying vehicles is created via these. The brake elements form a contact surface for creating the braking contact.

The brake elements can be attached on the brake body via a positive, non-positive or material fit connection or a combination thereof.

If the brake body is a chain, then the brake elements can be stuck or clipped between the limbs of a chain link in a clamping manner via a connection section The brake members in particular are wearing parts, which can be exchanged. The brake members in particular consist of a plastic, for example.

The braking contact in particular is a mechanical friction contact, i.e. a frictional contact between the conveying vehicle and the brake body. The braking contact in particular arises by way of the brake body exerting a contact pressure or a contact force upon the conveying vehicle. This contact pressure in particular is exerted by the intrinsic weight of a part of the brake body.

The braking effect as a result, amongst other things, is achieved by the intrinsic weight of a braking-active body section of the brake body, which bears on the conveying vehicle in the braking section.

The braking-active body section of the brake body is that body section which is in the position of creating a braking contact with the conveying vehicle, in order to brake the conveying vehicle.

The present invention is likewise directed toward a conveying device including a braking device. The conveying device in particular includes at least one conveying vehicle, which can be moved along a movement path.

The conveying vehicle in particular includes a contact element for creating a braking contact with the brake body. The contact element in particular forms a contact surface for creating the braking contact.

The contact element can be an integral part of the conveying vehicle. The contact element can also be a separate component that is attached on the conveying vehicle.

The contact element in particular is an element, which when considered in the movement direction, projects laterally from the conveying vehicle.

The contact element in particular can be a contact pin, contact cam or lug, a contact peg or a contact driver.

The brake body in the braking section is arranged with a braking-active body section in particular above the contact element of a conveying vehicle moving through the braking section.

The contact element for creating the braking contact moreover can carry out further functions. Thus, the contact element can also serve for forming a driver contact by way of the driver (catch) of a driver device.

The conveying vehicle moreover includes holding members, such as clips or hooks, for holding piece goods.

The piece goods, for example, can be individual goods such as preforms, cartridges, glasses, bottles, tins, foodstuff, such as sausages, cardboard packages, such as biscuit boxes and rod-like goods, such as sweets, tubes or cigars.

The piece goods in each case can also be a plurality of individual goods that, for example, are brought together into a common package such as pocket, in particular are brought together into a collection.

The conveying vehicles in particular are moved along the movement path independently of one another. The conveying vehicles in particular are designed such that they cannot be linked to one another.

As already mentioned, the braking device in particular forms a braking section. The braking section in particular leads along a section of the movement path of the conveying vehicles. The flexible brake body is led with a braking-active body section through the braking section.

The movement path of the conveying vehicles in particular is formed by a guide rail, along which the conveying vehicles can be moved. The conveying vehicles in particular are led by the guide rail.

The guide rail in particular leads through the braking section of the brake device.

The guide rail can be a round profile or a polygonal profile such as a hexagonal profile.

The guide rail can be of metal, such as steel or aluminium, or of plastic.

The guide rail in particular is connected via holding means to a support structure which is not explained in more detail at this location.

The guide rail in particular at its outer periphery forms running surfaces or sliding surfaces for the conveying vehicles.

The conveying vehicles can be movable along the guide rail in a sliding or rolling manner.

The conveying vehicles in particular include runner rollers for rolling along the guide rail.

The conveying vehicles can also include sliding elements for sliding along the guide rail.

The conveying vehicles in particular are moved along a conveying rail section through the braking section of the brake device.

The braking-active body section of the brake body, in the braking section and considered in the movement direction, in particular runs laterally of the guide rail for the conveying vehicles.

According to a further development of the invention, the brake device considered in the movement direction includes two flexible brake bodies of the type described above, which are arranged next to one another. The two brake bodies in particular are arranged in parallel.

The two brake bodies in the braking section and considered in the movement direction run with their braking-active body sections in particular laterally of the guide rail. The guide rail thereby in the braking section in particular runs between the two braking-active body sections.

The two brake bodies in particular are designed identically. The arrangement of the brake body and deflection member or deflection members in particular is designed identically. The two arrangements in particular are mirror-symmetrical to one another.

The two brake bodies can each be led about common deflection members or about separate deflection members.

According to a further feature of the invention, the brake device includes drive means for driving the brake body or the brake bodies. The brake body or bodies in particular are driven in a manner revolving around the deflection members.

The drive means can include a drive motor. The drive means can moreover include a transmission gear.

Thus, the drive means can drive the at least one deflection member, wherein the deflection member in turn drives the brake body.

The brake body can be revolvingly led around a single deflection member.

The brake body in particular is led about at least two deflection members spaced from one another. According to this further development, the brake body between the two deflection members includes an upper body section and a lower body section. The lower body section is led through the braking section. The lower body section in particular is a braking-active body section.

The flexible brake body in the braking section can be designed in a sagging manner if no conveying vehicles are present in the braking section. This can particularly be the case if the brake body is led about two deflection members distanced to one another. According to this further development, the lower braking-active body section in particular can be designed in a sagging manner between the at least two deflection members.

Sagging in particular means that the braking-active body section in the braking section is freely hanging in the gravity direction and is pulled downwards by its intrinsic weight, if no conveying vehicles are present in the braking section.

Sagging in particular also means that the braking-active body section in a middle region is situated lower than in a starting region and end region of the body section.

The braking-active body section in the braking section can sag freely down to, or below, the height of the guide rail.

The braking-active body section in the braking section in particular can sag freely to below the contact surface of the contact element of a conveying vehicle moved through the braking section.

According to one embodiment of the invention, the brake device includes a loading device which, in the braking section, acts upon the braking-active body section. The loading device can include a loading element, such as loading roller or loading cog, which exerts a loading force, in particular acting in the gravity direction, upon the braking-active body section. The loading element in particular is mounted in a compliant manner. The loading element in particular is spring-loaded.

This loading force counteracts the lifting force exerted by the conveying vehicle or by the contact element of the conveying vehicle onto the braking-active body section in the braking section and thus ensures an increased braking effect.

According to a further development of the invention, the brake device can include a deflection mechanism for setting the sagging of the brake body.

Thus, the brake body path outside the braking section can be increased or reduced via the deflection mechanism, by which means the amount of the sagging of the braking-active body section in the braking section is reduced or increased as compensation. A reduction of the sagging specifically means a reduction of the chain path in the braking section. An increase of the sagging means an increase of the chain path in the braking section.

The smaller the brake body path in the braking section is set outside the braking section by the deflection mechanism, the greater does the braking-active body section sag in the braking section. In contrast, the greater the brake body path in the brake body is set outside the braking section by the deflection mechanism, the less does the braking-active body section sag in the braking section, i.e. the more taut is the braking-active body section led in the braking section.

The brake device for this can include a rotatable deflection body that is arranged on a loading arm and that bears on the brake body.

The brake body can be deflected out of its movement path by way of changing the position of the deflection body with respect to the brake body. The greater then the deflection of the braking body outside the braking section, the greater is the brake body path outside the braking section.

The deflection body can be a roller or a cog. The loading arm can be a spring-loaded joint arm.

The deflection mechanism can be arranged, for example, on the upper body section.

As is yet explained in more detail in the subsequent method, the braking effect can be changed via the amount of the sagging of the brake body and, thus, via the amount of the deflection of the brake body, by way of the deflection mechanism.

The invention also relates to a method for braking a conveying vehicle moving along a movement path, by way of a brake device according to the invention.

According to the inventive method, the conveying vehicle in a braking section of the brake device meets or hits the braking-active body section of the brake body and moves along the braking section amid the formation of a braking contact with the brake body.

The brake body is led towards the braking section, in particular from the top to the movement path, in particular to the guide rail, of the conveying vehicle.

The braking-active body section in particular is lifted in the region of the braking contact, on creating the braking contact with the conveying vehicle in the braking section.

If the conveying vehicle to be braked now moves along the brake body through the braking section, then the braking body is continuously lifted in front of the conveying vehicle.

The brake body is lowered again behind or after the conveying vehicle, after passing the conveying vehicle.

The lifting and lowering of the brake body particularly results if the brake body sags in the braking section.

The lifting and lowering of the braking-active body section is thus activated by the conveying vehicle moving along the braking section in the movement direction.

If then the brake body moves into the braking region, then the brake body lifted in the region of the braking contact, considered in the movement direction, in particular is tensioned behind the conveying vehicle. The greater the speed of the conveying vehicle relative to the brake body in the braking section, the greater is the tension of the brake body behind the conveying vehicle. The mentioned tension therefore accordingly reduces with an increased braking of the conveying vehicle.

The brake body after passing the conveying vehicle is not immediately lowered again as a result of the tensioning of the brake body behind the conveying vehicle. The lower the speed of the conveying vehicle moving in the braking section, the quicker, however, is the lowering of the brake body behind the conveying vehicle effected.

The lifting and lowering of the brake body can lead to a wave-like movement in the braking-active body section, in the movement direction of the conveying vehicle. This is particularly the case if the brake body is not tensioned too much behind the conveying vehicle, and the lowering of the brake body behind the conveying vehicle is effected accordingly quickly.

According to an already mentioned further development of the invention, the at least one brake body is driven by a drive means.

The brake body in particular is driven at a defined speed.

The braking-active body section of the brake body in the braking section moves in the movement direction of the conveying vehicle moved through the braking section.

The conveying vehicle in the braking section in particular is braked to the speed of the braking-active body section.

The braking contact between the brake body and the conveying vehicle, after the braking of the conveying vehicle to the speed of the brake body, in particular becomes a drive contact, via which the conveying vehicle is driven at the speed of the braking-active body section.

The conveying vehicle leaves the braking section in particular at the speed of the driven braking-active body section.

The brake device according to this further development of the invention serves for braking the conveying vehicles at the entry of the braking section as well as for the drive of the conveying vehicle at the speed of the brake body at the exit of the braking section.

The brake device thus, on the one hand, fulfils the function of braking the conveying vehicle and, on the other hand, fulfils the function of releasing this from the brake device at a defined speed.

The conveying vehicle with the contact surface of its contact element in particular moves below the braking-active body section of the brake body, for creating the braking contact with the brake body in the braking section.

The conveying vehicle on entry into the braking section, with its contact element in particular runs below the braking-active body section.

The greater the brake body sags in the braking section, the greater is the brake body in the region of the braking contact lifted by the conveying vehicle, in particular by its contact element.

Accordingly, the wave movement described above also has greater amplitude. This leads to a comparatively high braking effect.

On the other hand it is the case that the more tautly the brake body is led in the braking section, the less is the brake body lifted by the contact element of the conveying vehicle in the region of the braking contact.

Accordingly, the wave movement described above has lower amplitude. This leads to a reduced braking effect.

The braking effect thus, on the one hand, is achieved by the friction between the conveying vehicle and the brake body and, on the other hand, is achieved by the lifting of the brake body in the braking section.

The present brake device permits a gentle, soft braking of the conveying vehicle which, despite this, is very effective. No knocks or impacts upon the conveying vehicle occur during the braking procedure thanks to the brake device according to the invention. The functionality of the subsequent processes is ensured by way of this.

The conveying device can include a control device for the control of the drive means of the brake device and thus of the speed of the brake body.

The conveying device according to the invention can include a conveying operated by gravity. With such devices, the conveying vehicles are moved with the support of gravity from a higher potential level along a movement path with a descent, to a lower potential level.

The conveying vehicles in particular are driven by gravity from a higher potential level towards the brake device, to a lower potential level.

The guide rail in particular has a descent, along which the conveying vehicle moves from the higher to the lower potential level.

The term "descent" means that the movement path has a direction component in the direction of gravity, and the conveying vehicles or drivers that are moved along the movement path have a movement component in the direction of gravity.

The conveying vehicles in such a conveying device are moved via the drivers of a driver drive from a lower to a higher potential level.

The guide rail in this section has an ascent. Ascent means that the movement path has a direction component that is opposite to the gravity direction and the conveying vehicles that are moved along the movement path have a movement component that is opposite to the gravity direction.

The conveying device according to the invention can be designed as a hanging conveyor. With a hanging conveyor, the piece goods are conveyed in a hanging manner at least in sections. The piece goods are conveyed in a hanging manner by way of the conveying vehicles, in particular in the braking section of the brake device.

The holding member with the piece good in particular is arranged below the guide rail in with respect to the gravity direction, with the hanging conveying.

BRIEF DESCRIPTION OF THE DRAWINGS

The subject-matter of the invention is hereinafter described in more detail by way of a preferred embodiment example which is represented in the accompanying drawing.

In each case shown in a schematic manner are.

DETAILED DESCRIPTION OF THE INVENTION

Figure 1:
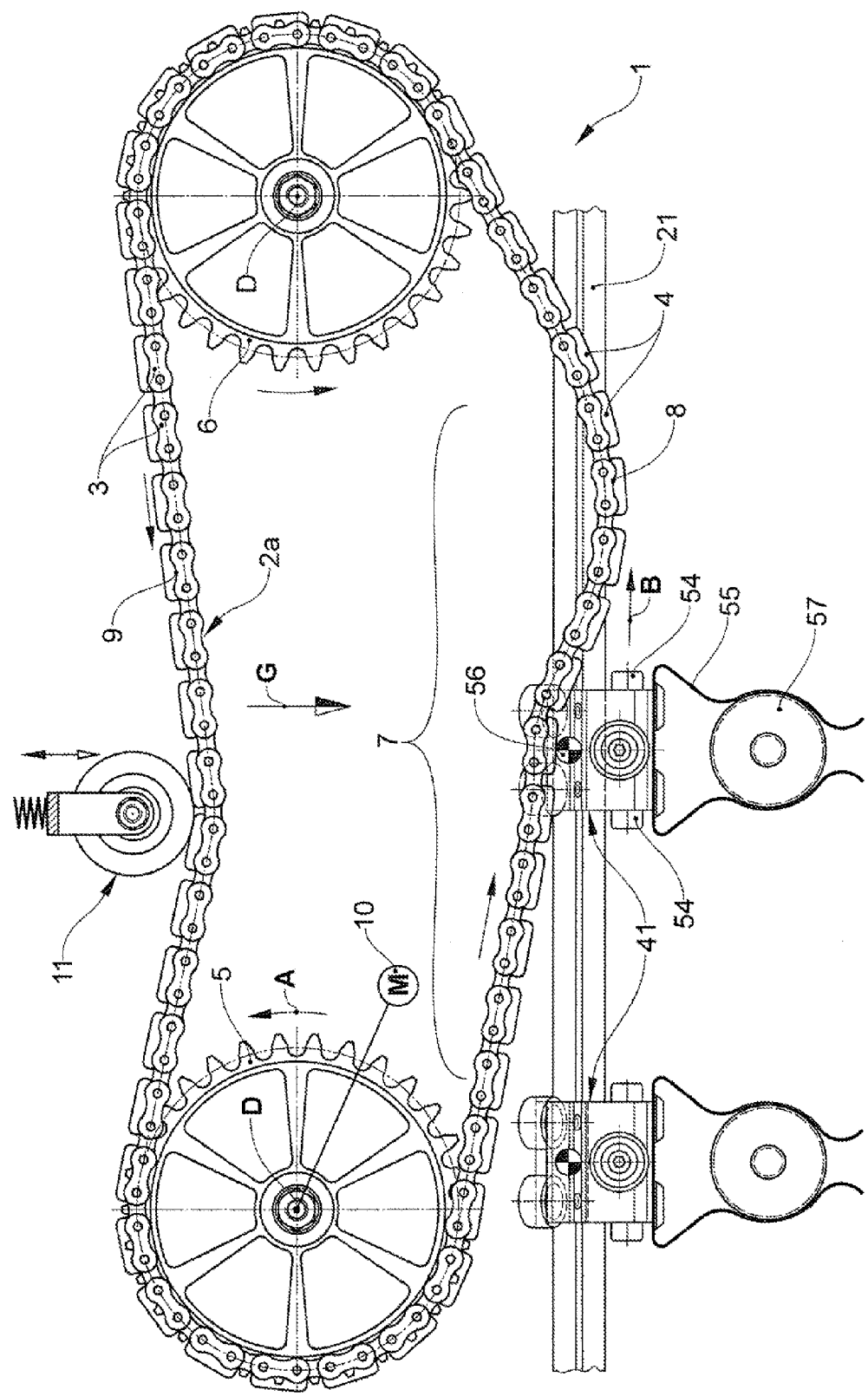
FIG. 1 is a lateral view of a brake device according to the invention.

The same parts are basically provided with the same reference numerals in the figures. The described embodiment example is an example of the subject-matter of the invention and has no limiting effect.

Figure 2:
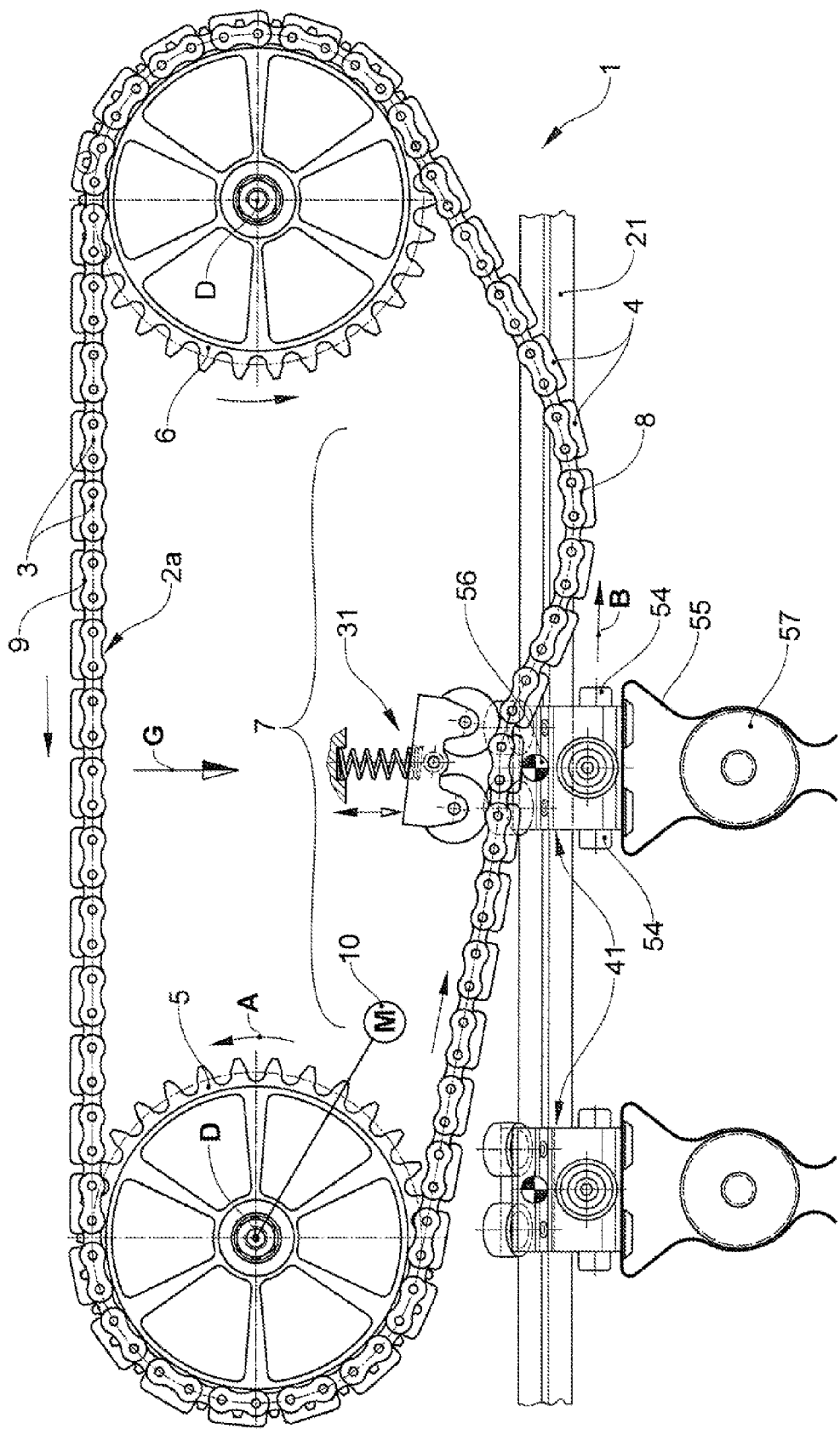
FIG. 2 is a lateral view of a brake device according to the invention, with a loading device.
Figure 3:
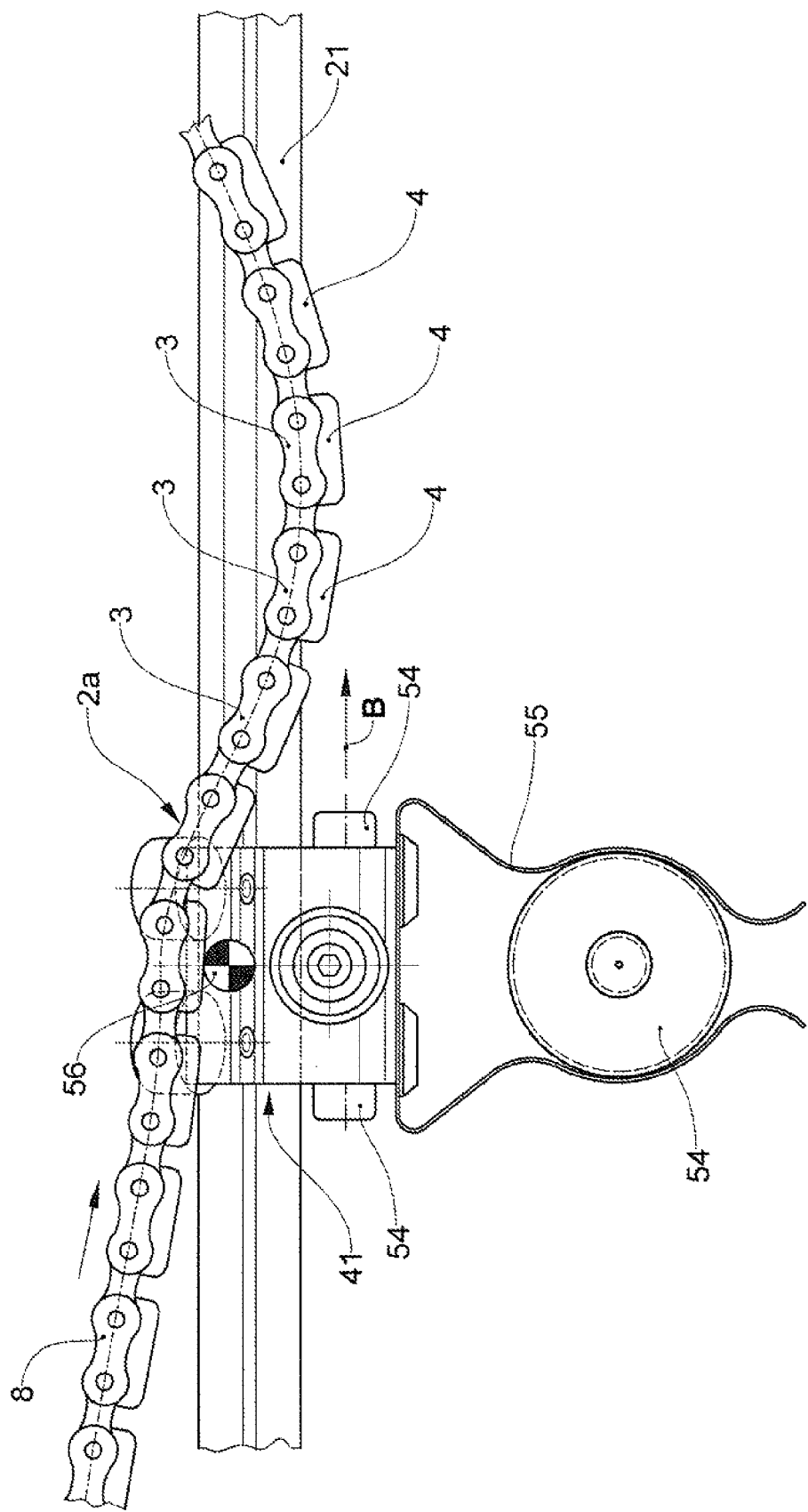
FIG. 3 is an enlarged detail of FIG. 1 from the region of the lower chain section.
Figure 4:
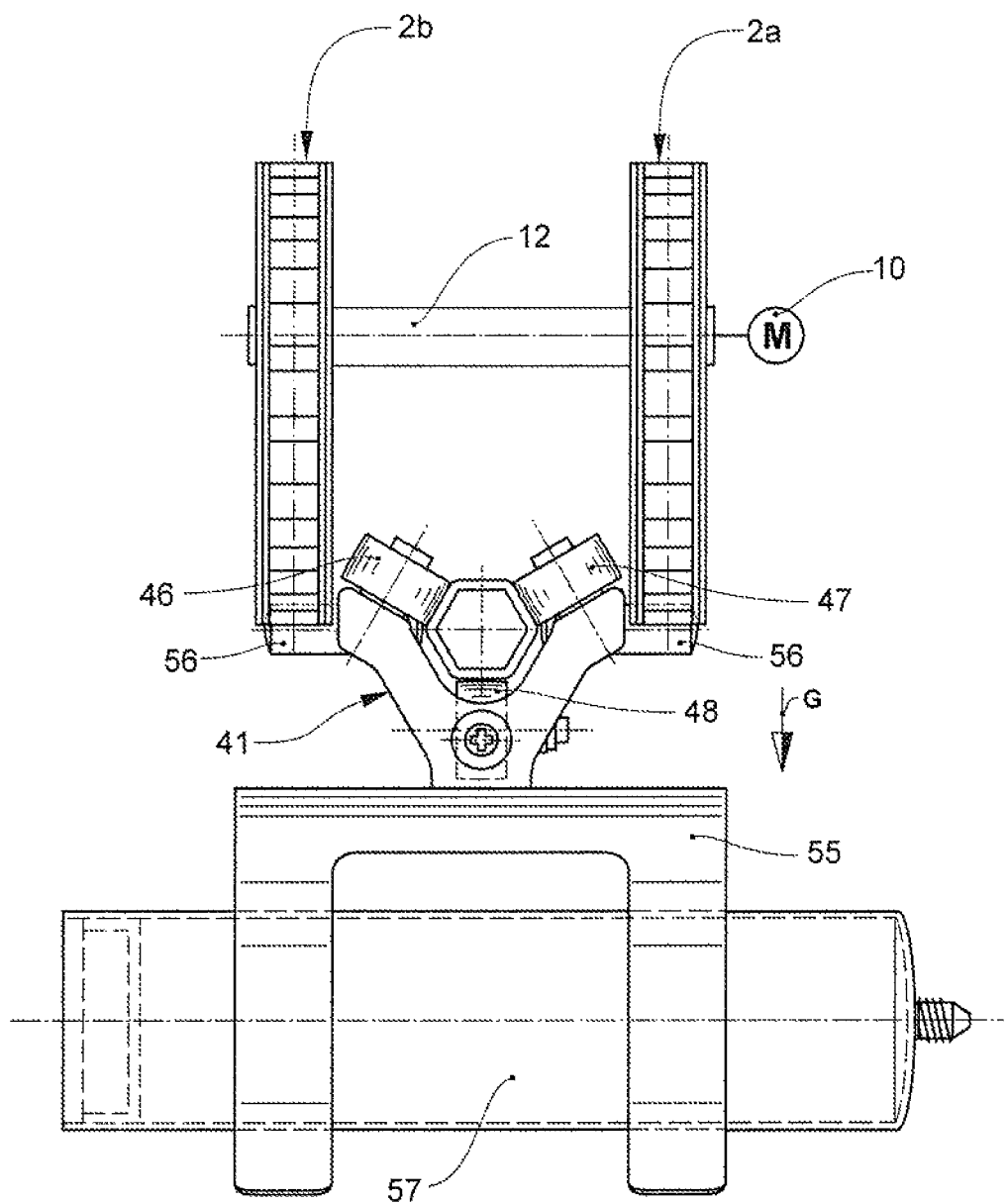
FIG. 4 is a front view of the brake device according to FIGS. 1 and 2 respectively; and, FIG. 5 is a perspective view of a rail-led conveying vehicle.

The braking device 1 represented in FIGS. 1 to 4 includes two brake chains 2a, 2b that are spaced from one another considered in the movement direction B (see in particular FIG. 4). The brake chains 2a, 2b, which run parallel to one another, are led in a revolving manner about two rotatably mounted deflection members 5, 6, which are spaced from one another. The two arrangements of brake chain 2a, 2b and deflection members 5, 6 are formed mirror-symmetrically to one another.

The deflection members 5, 6 of the two brake chains 2a, 2b, which are arranged next to one another, are coupled to one another via a common rotation pivot 12.

The deflection members 5, 6 are designed as cogs that each form a toothed engagement with the brake chains 2a, 2b.

The brake chains 2a, 2b consist of a plurality of chain links 3 that are articulately connected to one another.

Brake elements 4 are fastened on the chain links 3 of the brake chains 2a, 2b and with their contact surfaces form a braking contact with contact elements 56 of conveying vehicles 41, which are moved into the braking section 7.

The brake chains 2a, 2b between the two deflection members 5, 6 each form an upper chain section 9 and a lower, braking-active chain section 8.

The lower chain section 8 according to the embodiment variant according to FIG. 1 is arranged in a freely hanging manner in the gravity direction G.

The brake device 1 in the region of a lower, braking-active chain section 8 forms a braking section 7.

The deflection of the brake chain 2a, 2b can be set by way of a deflection mechanism 11 represented in the embodiment variant according to FIG. 1. The deflection mechanism 11 includes a deflection roller that is mounted or held on a loading arm, is rotatably mounted and bears on the upper chain section 9 of the brake chain 2a, 2b. The brake chain 2a, 2b is deflected to a greater or lesser extent depending on the position of the deflection roller. The greater the deflection, the larger does the chain path become. Compensating the larger chain path, the sagging in the braking section is shortened. The position of the deflection roller and, thus, the chain path can be set via the loading arm.

The lower chain section 8 in the braking section 7 sags to a greater or lesser extent depending on the position of the deflection roller and accordingly on the size of the chain path.

The guide rail 21 then in the braking section 7 is led through between the two freely hanging, lower chain sections 8 of the brake chains 2a, 2b.

One of the deflection members 5 is driven in the rotation direction A via a drive motor 10. The driven deflection member 5 in turn drives the brake chains 2a, 2b. The lower, braking-active chain section 8 is thereby driven in the movement direction of the conveying vehicles 41 arriving into the braking section 7.

The individual conveying vehicles 41 are moved independently of one another along the guide rail 21. The conveying vehicles 41 thereby roll along the guide rail 21 via runner rollers. The conveying vehicles 41 each include a holding member 55 in the embodiment of a holding clip for receiving a piece object 57, such as a cartridge.

The conveying vehicles 41 moreover each include two contact pins 56 for creating a braking contact with the brake members 4 of a brake chain 2a, 2b in each case. The two contact pins 56 considered in the movement direction B project laterally from the conveying vehicle 41, wherein a contact pin 56 in each case projects to each side. A brake chain 2a, 2b of the described type is assigned to each contact pin 56.

Further detail with regard to the conveying vehicle 41 can be deduced from the following description concerning FIG. 3.

According to the embodiment variant according to FIG. 2, the brake device 1 includes a loading device 31 which, in the braking section 7, acts upon the lower, braking-active chain section 8. The loading device 31 includes a spring-loaded loading element, such as loading roller, which exerts a loading force upon the lower chain section 8 and acting in the direction of gravity G. This loading force counteracts the lifting force that is exerted by the contact element 56 of the conveying vehicle 41 upon the lower chain section 8 in the braking section 7, and thus ensures an increased braking effect.

A conveying vehicle 41, which is moved along the guide rail 21 by way of gravity into the braking section 7 of the brake device 1, with its two contact pins 56 in each case comes into braking contact with the brake elements 4 of the lower chain section 8 of the two brake chains 2a, 2b.

The lower chain sections 8 of the brake chains 2a, 2b in the braking section 7 now sag to below the contact surface of the contact pin 56 of the conveying vehicle 41 moved into the braking section 7.

The contact element 56 of the conveying vehicle 41 moving into the braking section 7 therefore lifts the lower chain section 8 assigned to this, in the region of the braking contact.

The lower chain section 8 considered in the movement direction lowers again after passing the conveying vehicle 41, behind the contact element 56.

A wave-like movement of the lower chain section 8 through the braking section and propagating in the movement direction B is activated by way of the lifting and lowering of the brake chains 2a, 2b towards the end of the braking of the conveying vehicle 41, on account of the dynamic forwards movement of the conveying vehicle 41 to be braked, in the braking section 7. The wave-like movement has a lift and lowering amplitude.

The energy that is required for the lifting or for the displacement of the brake chains 2a, 2b upwards is taken from the kinetic energy of the conveying vehicles. This leads to a further braking effect apart from the friction forces in the region of the braking contact.

The conveying vehicles 41 in the braking section 7 are braked to such an extent until these have the speed of the driven, lower chain section 8.

The conveying vehicles 41 as result are moved along the guide rail 21 out of the braking section 7 with the speed of the brake chains 2a, 2b.

The conveying vehicles 41 can now be fed to a pacing device or to a processing device (not shown).

Figure 5:
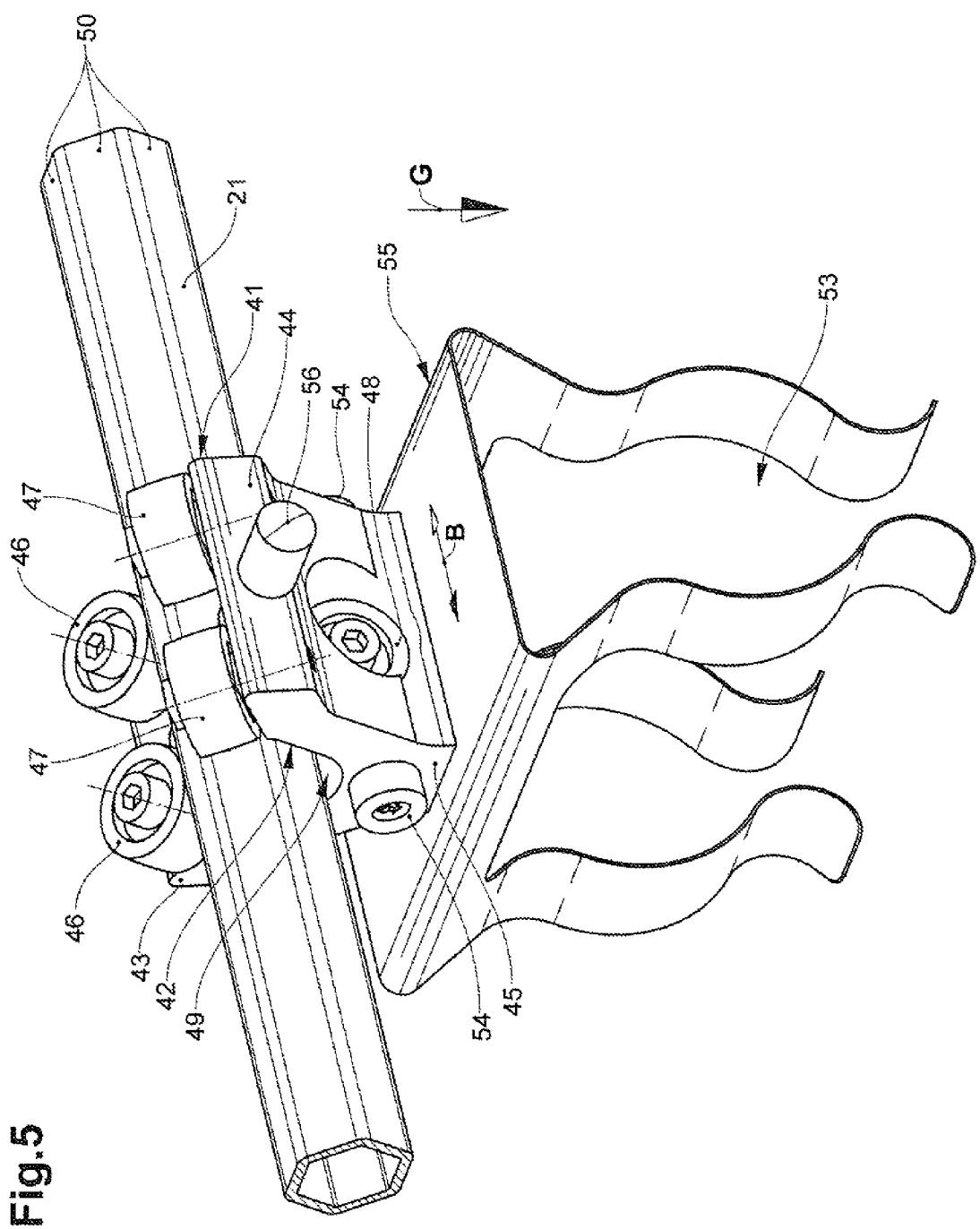

FIG. 5 shows a conveying vehicle 41 of a hanging conveyor that is designed as a gravity conveyer, as can be applied, for example, in a conveying device with a brake device 1 according to the invention and according to FIGS. 1 and 2, wherein the conveying vehicle is led on a guide rail 21.

The conveying vehicle 41 is designed as an outer runner. This means that the conveying vehicle 41 is arranged around the guide rail 21. The conveying vehicle 41 includes a base body 42 with a first and a second vehicle limb 43, 44, which are connected to one another via a connection section 45.

A pair of first runner rollers 46 is arranged in a rotatably mounted manner at the end section of the first vehicle limb 43. A pair of second runner rollers 47 is arranged in a rotatably mounted manner at the end section of the second vehicle limb 44. The runner rollers 46, 47 of the mentioned runner roller pairs are each arranged successively in the movement direction B. The paired arrangement of the first and second runner rollers 46, 47 are to prevent a tilting of the conveying vehicle 41 in the movement direction B.

An individual third runner roller 48 is arranged in a rotatably mounted manner on the connection section 45. The first, second and third runner rollers are arranged at an angle to one another.

The two vehicle limbs 43, 44 form a rail receiving space 49, through which the guide rail 21 is led. The guide rail 21 is a symmetrical hexagonal profile. The profile outer surfaces 50 form the runner surfaces for the runner rollers 46, 47, 48. The guide rail 21 however can generally be designed as a polygonal profile or even as a round profile.

Only a first runner roller can also be provided instead of two first runner rollers 46. Also only one second runner roller can be provided instead of two second runner rollers 47. Also two third runner rollers can be provided instead of a third runner roller 48. Infinite combinations are possible.

Moreover, also more than two first, second and/or third runner rollers arranged one after the other can be provided.

A holding clip 55 for receiving and for the clamped holding of a piece good is arranged at the outside on the connection section 45. Another conveying member such as a hook can also be arranged instead of a holding clip 55.

The holding clip 55 is arranged in a hanging conveying below the guide rail 21. The two vehicles limbs 43, 44 are led upwards from below laterally of the guide rail 21.

The holding clip 55 comprises clip limbs which enclose a receiving space for the piece goods 57. The holding clip 55 is formed from spring steel. The piece good 57 can be led into the receiving space 53 or out of this by way of spreading apart the clip limbs. The spring-elastic clip limbs hold the piece good 57 in the receiving space 53 in a clamped manner on account of their restoring force.

In each case a contact pin 56, which projects transversely to the movement direction B or transversely to the longitudinal direction of the guide rail 21, is arranged laterally on the first and the second vehicle limb 43, 44, for creating a braking contact with one of the brake chains 2a, 2b of a brake device 1 according to FIGS. 1 and 2.

The conveying vehicle 41 moreover includes abutment elements 54 at its front and rear side considered in the movement direction B, and these abutment elements damp knocks when two conveying vehicles 41, which are moved independently of one another, hit one another. The abutment elements 54 in particular are pegs of rubber-elastic material.

The invention claimed is:

1. A brake device for a conveying device for braking a conveying vehicle moving along a movement path, comprising:
   a guide rail,
   at least one conveying vehicle movable in a movement direction along a movement path formed by the guide rail, and
   at least one brake member for creating a braking contact with the conveying vehicle,
   wherein the brake member comprises two deflection members and at least one flexible brake chain with a braking-active chain section for creating a braking contact with the conveying vehicle, said brake chain being revolvingly led around the two deflection members.

2. The brake device according to claim 1, wherein the brake device forms a braking section, through which the braking-active chain section runs.

3. The brake device according to claim 2, wherein the braking-active chain section in the braking section is designed in a freely-hanging manner if no conveying vehicles are present in the braking section.

4. The brake device according to claim 2, wherein the brake device comprises a loading device, via which a loading force can be exerted onto the braking-active chain section in the braking section.

5. The brake device according to claim 2, wherein the braking-active chain section in the braking section, considered in the movement direction runs laterally of the guide rail for the conveying vehicles.

6. The brake device according to claim 2, wherein the brake device considered in the movement direction comprises two flexible brake chains that are arranged next to one another.

7. The brake device according to claim 6, wherein the two brake chains considered in the movement direction, in the braking section are arranged laterally of the guide rail for the conveying vehicles so that the guide rail in the braking section leads through between the two brake chains.

8. The conveying device according to claim 2, wherein the movement path runs through the braking section of the brake device.

9. The conveying device according to claim 2, wherein the at least one conveying vehicle in each case comprises a contact element with a contact surface for creating a braking contact with the brake chain.

10. The conveying device according to claim 9, wherein the braking-active chain section, in the braking section is arranged above the contact surface of the contact element of a conveying vehicle moving through the braking section.

11. The conveying device according to claim 9, wherein the contact element is an element projecting laterally of the conveying vehicle considered in the movement direction.

12. The brake device according to claim 1, wherein the brake device comprises a drive device for the revolving drive of the brake chain.

13. The brake device according to claim 1, wherein brake elements for creating a frictional braking contact with the conveying vehicle are attached on the brake chain.

14. The brake device according to claim 1, wherein the two deflection members are cogs, which are distanced to one another.

15. The brake device according to claim 14, wherein the brake chain between the two deflection members forms an upper chain section and a lower, braking-active chain section.

16. A method for braking a conveying vehicle moving along a movement path, by way of a braking device according to claim 1, wherein
   the conveying vehicle in a braking section of the brake device hits the braking-active chain section of at least one brake chain and moves along the braking section amid the formation of a braking contact.

17. The method according to claim 16, wherein the at least one brake chain is driven, wherein the conveying vehicle moving into the braking section is braked to the speed of the braking-active chain section and leaves the braking section at the speed of the driven, braking-active chain section.

18. The method according to claim 17, wherein, on creation of the braking contact with the conveying vehicle in the braking section, the braking-active chain section is lifted in the region of the braking contact.

19. The method according to claim 18, wherein the braking-active chain section executes a wave-like movement propagating in the movement direction of the conveying vehicle, by way of the lifting and lowering.

* * * * *